No. 825,895. PATENTED JULY 17, 1906.
J. DEGENHARDT.
GLASS ROOF.
APPLICATION FILED JAN. 12, 1905.
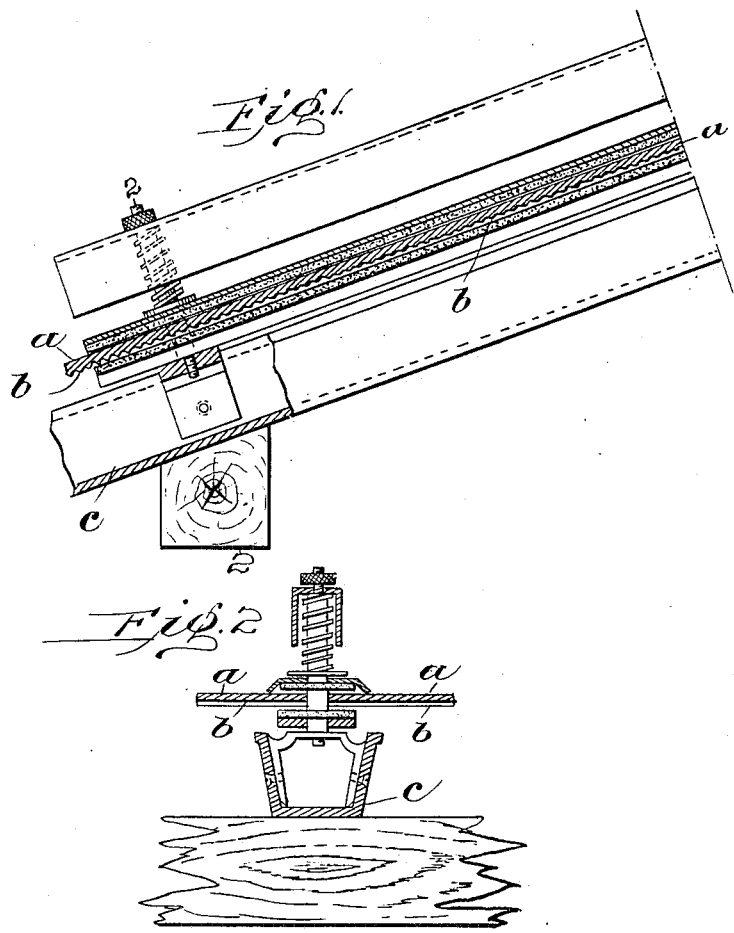
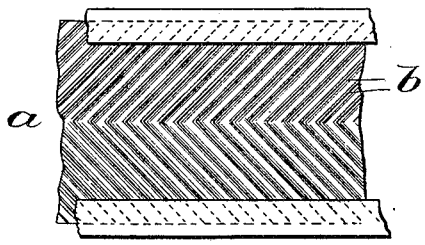
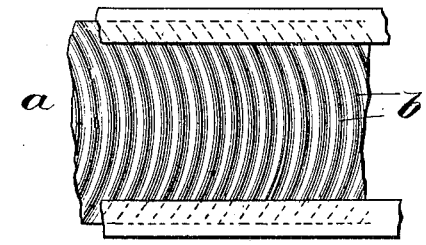

UNITED STATES PATENT OFFICE.

JOHANNES DEGENHARDT, OF BERLIN, GERMANY.

GLASS ROOF.

No. 825,895.     Specification of Letters Patent.     Patented July 17, 1906.

Application filed January 12, 1905. Serial No. 240,737.

*To all whom it may concern:*

Be it known that I, JOHANNES DEGENHARDT, a citizen of the German Empire, residing at Berlin, Germany, have invented certain new and useful Improvements in Glass Roofs; and I do hereby declare the following to be a full, clear, and exact description of the invention, such as will enable others skilled in the art to which it appertains to make and use the same.

This invention relates to improvements in glass roofs with channeled or trough-like cross-bars for draining off the sweat, so as to prevent its dropping.

For this purpose glass plates have hitherto been used whose outer surfaces were arched and which made the roof very uneven.

The particular object of the present invention is to obtain an equally quick drainage of the condensed moisture from plates whose outer surface is flat instead of being arched and which is effected by providing the under surface of the plates with ribs, so that channels are formed down which the moisture is conducted to the cross-bars or troughs, to be carried off in the usual way.

I will explain my invention with reference to the accompanying drawings, in which—

Figure 1 is a vertical longitudinal section of a part of a glass roof as per the present invention. Fig. 2 is a cross-section on line 2 2 of Fig. 1. Figs. 3 and 4 show glass plates with grooves as per the present invention, the grooves being made to run curved or angular.

The glass plates $a$ are provided on the whole under surface with ribs $b$, running inclined to the cross-bars $c$ in diagonal, curved, or angular direction and forming corresponding grooves which lead the moisture from the glass into the channeled cross-bar or trough $c$. If found convenient, the glass plates can also be provided with longitudinal ribs, which join the cross-ribs at any convenient angle.

The moisture from the various grooves mixes together on the supported edge of the glass plate and then begins to drop in the cross-bar or trough $c$, to be drained off in the usual way.

Having now described my invention, what I claim, and desire to secure by Letters Patent, is—

1. In a roof, the combination, with grooved beams, of roofing-plates arranged with their edges overlapping the beams and provided on the under side with ribs inclined to the horizontal and leading in downwardly-divergent lines from the medial portion of the plate to the edge thereof.

2. In a roof, the combination, with supporting grooved beams inclined to the horizontal, of exteriorly smooth glass roofing-plates arranged with their edges overlapping the beams and provided on the under side with ribs inclined to the horizontal and leading in downwardly-divergent lines diagonally from the medial portion of the plate to the edge thereof.

3. Improvements in glass roofs consisting in the combination, with trough-like cross-bars, of glass plates exteriorly flat but provided on their under sides with ribs running in a curved direction from the medial portion of the plates downwardly and outwardly to the edges thereof.

In testimony whereof I have hereunto affixed my signature in the presence of two witnesses.

JOHANNES DEGENHARDT.

Witnesses:
     WOLDEMAR HAUPT,
     HENRY HASPER